(12) United States Patent
Manca (10) Patent No.: US 12,117,708 B2
(45) Date of Patent: Oct. 15, 2024

(54) THERMO-RESPONSIVE DUAL BAND ELECTROCHROMIC DEVICE

(71) Applicant: ACONDICIONAMIENTO TARRASENSE, Barcelona (ES)

(72) Inventor: Michele Andrea Manca, Barcelona (ES)

(73) Assignee: ACONDICIONAMIENTO TARRASENSE, Barcelona (ES)

( * ) Notice: Subject to any disclaimer, the term of this patent is extended or adjusted under 35 U.S.C. 154(b) by 376 days.

(21) Appl. No.: 17/765,696

(22) PCT Filed: Sep. 25, 2020

(86) PCT No.: PCT/EP2020/076921
§ 371 (c)(1),
(2) Date: Mar. 31, 2022

(87) PCT Pub. No.: WO2021/063832
PCT Pub. Date: Apr. 8, 2021

(65) Prior Publication Data
US 2022/0350218 A1 Nov. 3, 2022

(30) Foreign Application Priority Data
Oct. 1, 2019 (EP) .................................. 19382843

(51) Int. Cl.
*G02F 1/1516* (2019.01)
*G02F 1/1343* (2006.01)
(Continued)

(52) U.S. Cl.
CPC ...... *G02F 1/15165* (2019.01); *G02F 1/13439* (2013.01); *G02F 1/1503* (2019.01);
(Continued)

(58) Field of Classification Search
CPC ........... G02F 1/15165; G02F 2001/164; G02F 2202/10; G02F 2203/11; G02F 1/1503;
(Continued)

(56) References Cited

U.S. PATENT DOCUMENTS 6,193,912 B1 2/2001 Thieste
9,207,513 B2 12/2015 Milliron
(Continued)

FOREIGN PATENT DOCUMENTS

EP 1227362 A1 7/2002
WO 2011144306 A1 11/2011
(Continued)

OTHER PUBLICATIONS

Jacob Jensen, "Development and Manufacture of Polymer-based Electrochromic Devices", Article, 2015, 1-18, Advanced Functional Materials.
(Continued)

*Primary Examiner* — Michael H Caley
*Assistant Examiner* — William D Peterson
(74) *Attorney, Agent, or Firm* — Hayes Soloway P.C.

(57) ABSTRACT

It relates to a thermo-responsive dual band electrochromic device, which is capable of selectively controlling the amount of sunlight radiation transmitted in the visible and in the near-infrared regions by operating under four distinct optical regimes, namely: fully transparent, visible blocking, near-infrared blocking, and fully blocking. The device can be regulated either by an electric stimulus, namely by controlling the sign and the intensity of the applied bias voltage, or by a thermal stimulus. In the latter the attenuation of incoming thermal radiation results increased as temperature increases. The thermo-responsive dual band electrochromic device comprises a first electrode consisting of a first transparent conductive substrate topped by a first elec- (Continued)

tro-optically active layer and a second electrode consisting of a second transparent conductive substrate topped by a second electro-optically active layer separated by a temperature-dependent ion conductive layer consisting of a thermo-responsive polymer gel, an ion conductor and a plasticizer.

20 Claims, 4 Drawing Sheets

(51) Int. Cl.
*G02F 1/1503* (2019.01)
*G02F 1/155* (2006.01)
*G02F 1/15* (2019.01)

(52) U.S. Cl.
CPC ........ *G02F 1/155* (2013.01); *G02F 2001/164* (2019.01); *G02F 2202/10* (2013.01); *G02F 2202/36* (2013.01); *G02F 2203/11* (2013.01)

(58) Field of Classification Search
CPC ... G02F 1/13439; G02F 1/155; G02F 2202/36
USPC .......................................................... 359/265
See application file for complete search history.

(56) References Cited

U.S. PATENT DOCUMENTS

| | | | |
|---|---|---|---|
| 2014/0220362 A1 | 8/2014 | Milliron et al. | |
| 2015/0277202 A1 | 10/2015 | Mattox et al. | |
| 2018/0088426 A1* | 3/2018 | Posset ...................... | G02F 1/15 |

FOREIGN PATENT DOCUMENTS

| | | | | |
|---|---|---|---|---|
| WO | 2013016318 A2 | 1/2013 | | |
| WO | WO-2013003548 A2 * | 1/2013 | .............. | B82Y 20/00 |
| WO | WO-2015160829 A1 * | 10/2015 | ............... | B05D 1/18 |

OTHER PUBLICATIONS

Evan L. Runnerstrom, "Nanostructured Electrochromic Smart Windows: Traditional Materials and NIR-selective Plasmonic Nanocrystals", Article, 2013, 1-19, ChemComm.
Anonymous, "Standard Test Method for Haze and Luminous Transmittance of Transparent Plastics", Article, 2021, 1-6, ASTM International.
Anonymous, "Procedure for Measuring the Steady-State Thermal Transmittance of Fenestration Systems", Journal, 2013, 1-45, National Fenestration Rating Council Incorporated (NFRC).
Cheng-Hung Chang, "Novel Rapid Switching and Bleaching Electrochromic Polyimides Containing Triarylamine with 2-phenyl-2-isopropyl Groups", Journal, 2010, 4493-4502, vol. 51, Polymer.
Fatma Baycan Koyuncu, "An Ambipolar Electrochromic Polymer Based on Carbazole and Naphthalene Bisimide: Synthesis and Electro-Optical Properties", Journal, 2012, 184-191, vol. 68, Electrochimica Acta.
Sheng-Huei Hsiao, "A Comparative Study of Redox-Active, Ambipolar Electrochromic Triphenylamine-based Polyimides Prepared by Electrochemical Polymerization and Conventional Polycondensation Methods", Article, 2017, 1-31, Polymer Chemistry.
Saurabh S. Soni, "Ionic Conductivity Through Thermoresponsive Polymer Gel: Ordering Matters", Article, 2012, 751-756, vol. 28, Langmuir-ACS Publications.
Carla Dalmolin, "Electropolymerization of Polyaniline on High Surface Area Carbon Substrates", Journal, 2005, 9-15, vol. 578, Journal of Electroanalytical Chemistry.
B. Munro, "All sol-gel Electrochromis System for Plate Glass", Journal, 1997, 185-188, vol. 218, Journal of Non-Crystalline Solids.
Yoshimasa Matsumura, "Communication-Synthesis of Fluorine-Free Highly Ion Conductive Polymer Electrolyte Having Lithium Bissulfonimide Unit", Journal, 2018, 3119-3122, vol. 165, No. 8, Journal of the Electrochemical Society.
Eunju Jeon, "Synthesis and characterization of star-shaped imide compounds", Journal, 2012, 19-20, vol. 1, Rapid Communication in Photoscience.
Comin & Manna, "New materials for tunable plasmonic colloidal nanocrystals", Chemical Society Reviews, 2014, Issue 11, pp. 3957-3975, 19 pages.
Niederberger, "Nonaqueous Sol-Gel Routes to Metal Oxide Nanoparticles", ACS Publications, Accounts of Chemical Research, 2007, vol. 40, Issue 9, pp. 793-800, 8 pages.
Choi et al, "Preparation and Optical Properties of Colloidal, Monodisperse, and Highly Crystalline ITO Nanoparticles", ACS Publications, Chemistry of Materials, 2008, vol. 20, Issue 8, pp. 2609-2611, 3 pages.
Gilstrap Jr. et al., "Synthesis of a Nonagglomerated Indium Tin Oxide Nanoparticle Dispersion", Advanced Materials, 2008, vol. 20, Issue 21, pp. 4163-4166, 4 pages.

* cited by examiner

THERMO-RESPONSIVE DUAL BAND ELECTROCHROMIC DEVICE

CROSS-REFERENCE TO RELATED APPLICATIONS AND PRIORITY

This patent application claims priority from PCT Application No. PCT/EP2020/076921 filed Sep. 25, 2020, which claims priority from European Patent Application No. 19382843.1 filed Oct. 1, 2019. Each of these patent applications are herein incorporated by reference in their entirety.

TECHNICAL FIELD

The present invention relates to an electro-optical device capable of regulating the intensity of incoming optical radiation over at least two distinct spectral regions in response to either an electrical or a thermal stimulus.

BACKGROUND ART

Electrochromic windows offer reversible and fast optical switching between the clear and dark states with large contrast. Compared to other types of smart window technologies, electro-responsive systems offer uniform optical properties in different states. A notable example is the auto-dimming smart windows developed by Gentex Corporation, which are now installed on Boeing's 787 Dreamliner aircraft. [J. Jensen, M. Hösel, A. L. Dyer, F. C. Krebs, Adv. Funct. Mater. 2015, 25, 2073. /www.gentex.com]. It allows the passengers to control the amount of sunlight transmitted through the windows by a few simple touches at a low voltage. A typical design for window applications consists of five thin film layers on a single glass substrate or sandwiched between two glass substrates, wherein the absorption spectrum of one or more electrochromic materials is changed by oxidation or reduction reactions. That is, the electrochromic material does not emit light by itself, but takes on a colour through light absorption. Electrochromic devices having these properties are widely used for uses such as mirrors and sunroofs for vehicles, smart windows, and outdoor displays.

Motivated by the great potential for energy savings coming from the reduction of cooling and heating loads, there has been a growing demand to selectively regulate the infrared waves, without affecting (or affecting limitedly) the visible (VIS) transparency. In particular, about half of the solar energy that is incident upon a window lies in the near-infrared (NIR) spectral region and does not contribute to daylighting.

The recent research achievements in the field of NIR-selective plasmonic nanomaterials are paving the way to the realization of a next generation of dual band smart windows, which are capable of achieving independent control over the NIR spectral region. Electrochromic devices based on plasmonic nanocrystals enabled indeed NIR selective operation, inherently rapid switching and greatly enhanced durability [Runnerstrom et al. Chem. Commun., 2014, 50, 10555]. See for example: U.S. Pat. No. 6,193,912 entitled "NEAR INFRARED-ABSORBING ELECTROCHROMIC COMPOUNDS AND DEVICES COMPRISING SAME", Us. Pat. No. US2015/022980 "CONDUCTIVE TRANSITION METAL OXIDE ELECTROCHROMIC MATERIAL AND OPTICAL SWITCHING DEVICES CONSTRUCTED THEREOF", US pat. No U.S. Pat. No. 9,207,513B2 "NANOCRYSTAL-POLYMER NANOCOMPOSITE ELECTROCHROMIC DEVICE", US pat No. US2012/047935 "ELECTROCHROMIC NANOCOMPOSITE FILMS.

Separate dynamic control over NIR and VIS spectral regions is of particular interest for the development of energy-efficient glass façades in view of the fascinating perspective of realizing systems that can admit abundant daylight while conveniently regulating the thermal radiation entering the window. However, to date commercially available electrochromic dynamic windows are unable to independently control the luminous transmittance $T_{LUM}$ (measured according to ASTM D 1003-07 standard) and solar heat gain coefficient SHGC (measured according to ASTM C 1199-14 standard).

Market perspectives of these technologies are expected to be broadened on the basis of enhanced comfort for building's occupant and especially as part of a package where smart windows are combined with smart lighting to provide optimal lighting and heating control.

While the above-indented references disclose utilizing a plurality of anodic and cathodic materials as active electrodes of an electrochromic device, to the best of applicant's knowledge, they are unable to concomitantly provide the following functionalities: 1. to selectively regulate NIR radiation independently from VIS transmittance; 2. to responsively regulate their thermal transmittance depending on the device temperature. The inability to operate in this manner has caused prior art devices to be limited in a number of applications.

OBJECT OF THE INVENTION

The object of the present invention is a thermo-responsive dual band electrochromic device.

DETAILED DESCRIPTION OF THE INVENTION

The object of the present invention is a thermo-responsive dual band electrochromic device, which comprises:
1) a first transparent conductive substrate where a first electro-optically active electrode is deposited thereon, wherein the first electro-optically active electrode consists of at least a nanocrystalline transparent semiconducting layer and at least an electrochromic layer, wherein the first electro-optically active electrode is realized as one of the following embodiments:

1a. a combination of a plurality of transparent conductive oxide nanocrystals, which permit regulating the optical transmittance in the NIR range, and at least an electrochromic polymer layer that permits regulating the optical transmittance in the VIS range, or 1b. a combination of a plurality of transparent metal oxide nanoparticles, which permit regulating the optical transmittance in the VIS range, and at least an electrochromic plasmonic layer that permits regulating the optical transmittance in the NIR range, or 1c. a combination of a plurality of transparent semiconducting nanoparticles, which remain substantially transparent both in the VIS and in the NIR range over the whole operative potential range, and ambipolar electrochromic polymeric capable of reversibly modulating the VIS transmittance in response to both a negative and a positive applied potential, 2) a second transparent conductive substrate where a second electro-optically active electrode is deposited thereon, wherein the second electro-optically active electrode consists of a plurality of transparent semiconducting nanoparticles that:

2a and 2b: remain substantially transparent over the potential range wherein the first nanocrystalline transparent conductive layer can be switched to a low transmittance state, when the first electro-optically active electrode is selected from 1a or 1b, or 2c: regulate the optical transmittance in the NIR range in response to a negative potential within a range of potentials, wherein the ambipolar electrochromic polymer results substantially transparent, when the first electro-optically active electrode is 1c, and 3) a temperature-dependent ion conductive layer embedded between the first electro-optically active electrode and second electro-optically active electrode, wherein the temperature-dependent ion conductive layer comprises a thermo-responsive polymer gel, an ion conductor and an organic plasticizer.

The here disclosed thermoresponsive dual band electrochromic device is surprisingly capable of selectively regulate the VIS radiation independently from the NIR transmittance; and responsively regulate their thermal transmittance depending on the device temperature. It permits of:

1. selectively and reversibly regulating the intensity of transmitted optical radiation both in the visible and in the near-infrared spectral range in response to a specific applied bias potential;
2. responsively attenuating the optical transmittance in the near-infrared spectral range as the device temperature increases.

It may be used to realize dynamically switchable smart glazing for a vast range of applications ranging from buildings and constructions to transportations and automotive.

The device is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

In the present description, as well as in the claims, the singular forms "a", "an" and "the" include the plural reference unless the context clearly indicates otherwise. The ranges defined by the preposition "between" include also the two ends thereof.

The expression "electro-optically active" refers thereafter to a physical system whose optical properties can be modified and/or tuned through the application of an electrical stimulus.

The expression "substantially transparent" referred to a substrate, a film, a layer, or a material indicate a condition of high optical transmittance of that substrate, film, layer or material. It must be intended as associated to an overall transmittance of above 80%.

Definitions and Abbreviations $$T_{NIR} = \frac{\int_{680}^{3500} T(\lambda)E(\lambda)d\lambda}{\int_{680}^{3500} E(\lambda)d\lambda}$$

where $T(\lambda)$ is the optical transmittance at a given wavelength $\lambda$, and $E(\lambda)$ is the solar irradiance spectrum ASTM G-173 for air mass 1.5.

$$T_{LUM} = \frac{\int_{380}^{680} T(\lambda)\varphi(\lambda)d\lambda}{\int_{380}^{680} \varphi(\lambda)d\lambda}$$

where $T(\lambda)$ is the optical transmittance at a given wavelength $\lambda$, and $\varphi(\lambda)$ the spectral sensitivity of the light-adapted human eye.

LSPR: Localized Surface Plasmon Resonance
LUMO: lowest unoccupied molecular orbital
$V_{OC}$: open circuit potential
$V_{NIR-ON}$: anodic potential corresponding to onset of the regulation of $T_{NIR}$
$V_{NIR-SAT}$: anodic potential corresponding to the saturation of $T_{NIR}$
$V_{LUM1-ON}$: anodic potential corresponding to onset of the regulation of $T_{LUM}$
$V_{LUM1-SAT}$: anodic potential corresponding to the saturation of $T_{LUM}$
$V_{LUM2-ON}$: cathodic potential corresponding to the onset of the regulation of $T_{LUM}$
$V_{LUM2-SAT}$: cathodic potential corresponding to the saturation of $T_{LUM}$
TCO: transparent conductive oxide
ITO: indium tin oxide
SEM: Scanning Electronic Microscope According to the schematic representation of the electro-optical behaviour of the here disclosed dual band thermoresponsive electrochromic device (see FIG. 1), when a negative (anodic) potential ranging between $V_{NIR-ON}$ and $V_{NIR-SAT}$ is applied to the first transparent conductive substrate, $T_{NIR}$ is consistently reduced from the initial value (higher than 75, and preferably higher than 85%) to its saturation value (lower than 10% and preferably lower than 1%), while $T_{LUM}$ remains high (preferentially higher than 85%). At higher negative potentials, namely ranging from $V_{LUM1-ON}$ to $V_{LUM1-SAT}$, the electrochemical oxidation of one of the electrochromic materials constituting a first electro-optically active electrode turns into a dramatic reduction of $T_{LUM}$ too, till a saturation value is reached in correspondence of $V_{LUM1-SAT}$, where a value of $T_{LUM}$ lower than 15% comes to be observed, and preferentially lower than 5%.

Figure 1:
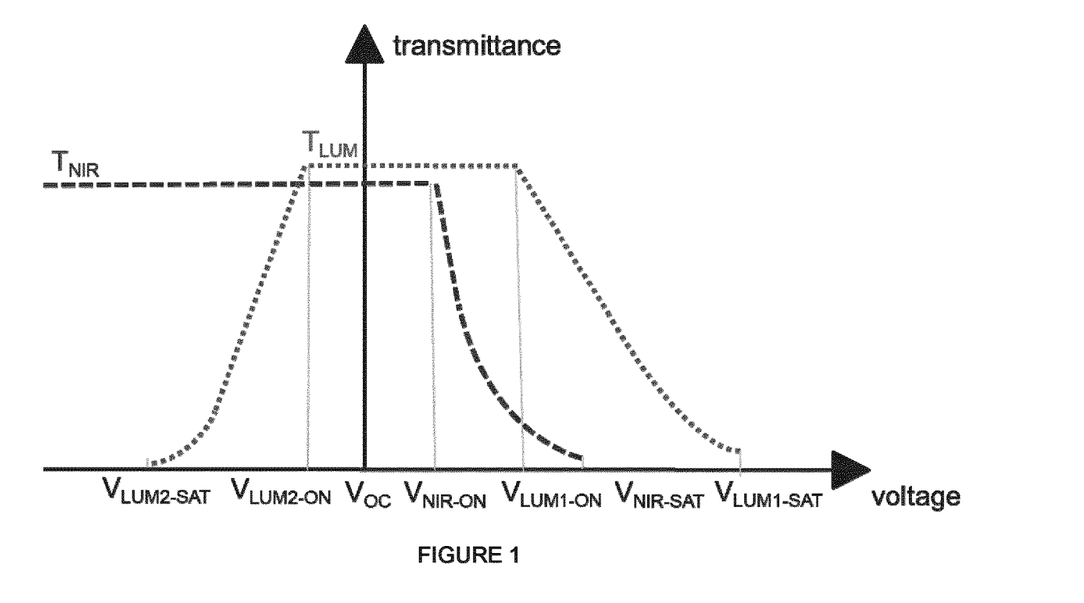
FIG. 1 reports a schematic representation of the dual band regulation mechanism permitted by the here disclosed dual band electrochromic device: variation of $T_{NIR}$ and $T_{LUM}$ is plotted as a function of the applied bias voltage.

When a positive (cathodic) potential ranging between $V_{OC}$ and $V_{LUM2-ON}$ is applied to the first transparent conductive substrate, the dual band electrochromic device turns substantially transparent both in the VIS and in the NIR range. At higher positive potentials, namely comprised between $V_{LUM2-ON}$ and $V_{LUM2-SAT}$, the first electro-optically active electrode undergoes an intense coloration that drives dual band electrochromic device in the VIS-blocking state: $T_{LUM}$ selectively drops down to a value lower than 15% and preferentially lower than 5%, while $T_{NIR}$ keeps higher than 75% and preferentially higher than 85%. When a negative potential ranging between $V_{OC}$ and $V_{NIR-ON}$ is applied to the first transparent conductive substrate, the dual band electrochromic device returns to its fully transparent state.

In addition to the above described electro-optical responsivity, the temperature-dependent ion conducting layer confers the here disclosed device a supplementary peculiar thermal responsivity, which is synergistically combined with the dual-band electrochromisms and makes it capable of intelligently regulating $T_{NIR}$ in response to a given range of temperature variations. In particular, upon the application of a negative (anodic) potential compromised between $V_{NIR-ON}$ and $V_{NIR-SAT}$ to a first electro-optically active electrode, the electrochromic device responds to environmental temperature variations, as for instance to those associated to daily and seasonal variation of sunlight intensity, by regulating both $T_{NIR}$ and the corresponding switching times. It is to say that at higher sunlight intensities the device responds with lower $T_{NIR}$ and fastest switching time. It must be pointed out that such thermo-responsivity is not provided as an independent operative mechanism, as it can be only activated once an electric bias voltage comprised between $V_{NIR-ON}$ and $V_{NIR-SAT}$ has been applied to the device. It is conceived to trigger an additional option for the regulation of the here disclosed dual band electrochromic device when this is operating as NIR dynamic filter.

First and Second Transparent Conductive Substrates

Both the first transparent conductive substrate (100) and the second transparent conductive substrate (200) are constituted by a transparent glass substrate, respectively (101) and (201) topped by a transparent conductive layer, respectively (102) and (202). The composition and thickness of the transparent glass substrate and of the transparent conductive layer can be chosen among a wide variety. The transparent conductive layers (102) and (202) may be formed from transparent conducting films prepared using inorganic and/or organic materials. For example, the transparent conductive layers (102) and (202) may include inorganic films of transparent conducting oxides, such as indium tin oxide (ITO), aluminium zinc oxide (AZO), doped variants thereof, derivatives thereof, or combinations thereof. Usually, the thickness is comprised between 10 nm and 1000 nm, preferably between 80 nm and 400 nm. They must however guarantee the transparent conductive substrates (100) and (200) provide an optical transmittance higher than 80%, and preferably higher than 90% in the spectral range comprised between 380 nm and 2500 nm. The sheet resistance of the thin transparent conductive layers (102) and (202) is comprised between 0.1 Ω/sq and 200 Ω/sq, and preferably between 10 Ω/sq and 50 Ω/sq. They are generally deposited or otherwise formed by a process selected from spray pyrolysis, solution-based coating, sputtering, evaporation, physical vapor deposition or chemical vapor deposition.

First Electro-Optically Active Electrode

In any embodiments of the here disclosed invention the first electro-optically active electrode (103) consists of at least a nanocrystalline transparent semiconducting layer (104) and at least an electrochromic layer (106).

With reference to the "T vs V" diagram reported in FIG. 1, in various embodiments the nanocrystalline transparent semiconducting layer (104) is constituted by at least an electro-optically active material that responds to the application of a negative (anodic) potential comprised between $V_{NIR-ON}$ and $V_{NIR-SAT}$ with a reversible modulation of $T_{NIR}$ and the electrochromic layer (106) is constituted by an electro-optically active material that responds to the application of a negative (anodic) potential comprised between $V_{LUM1-ON}$ and $V_{LUM1-SAT}$ with a reversible modulation of $T_{LUM}$ In a first preferred embodiment of the here disclosed invention the nanocrystalline transparent semiconducting layer (104) comprises a plurality of weakly-doped metal oxide nanoparticles (105) that exhibit an electrochemically tuneable localized surface plasmon resonance (LSPR) scattering in a spectral region comprised between 800 nm and 2500 nm.

The reliable exploitation of the extraordinary optical prerogatives of electron oscillations at the interface between weakly-doped semiconducting nanoparticle (105) and a dielectric medium-which are generally referred to as localized surface plasmons-offers in fact a unique opportunity to selectively control the intensity of incoming NIR (thermal) radiation without affecting the window's transparency (see Runnerstrom et al. NANOSTRUCTURED ELECTROCHROMIC SMART WINDOWS: TRADITIONAL MATERIALS AND NIR-SELECTIVE PLASMONIC NANOCRYSTALS, Chem. Commun. 2014, 50, 10555-10572). This effect has been associated to a purely capacitive charging mechanism: the magnitude of the shift across the applied bias modulation depends on film thickness, nanoparticles size, and doping level, since it is reasonably proportional to the concentration of free carriers on the nanoparticles surface.

The weakly-doped metal oxide nanoparticles (105) are formed by Nb-doped titanium oxide, Cs-doped tungsten oxide or Al-doped zinc oxide and preferably by sub-stoichiometric tungsten oxide or Sn-doped indium oxide (or indium tin oxide, ITO). They may be synthesized by using any of the well-known wet chemistry colloidal routes reported in the technical literature [see for instance "NEW MATERIALS FOR TUNABLE PLASMONIC COLLOIDAL NANOCRYSTALS". Chem. Soc. Rev., 2014, 43, 3957-3975]. For example, solutions of ITO nanoparticles may be synthesized using well-known colloidal synthetic procedures, as those referred in "SYNTHESIS OF A NON-AGGLOMERATED INDIUM TIN OXIDE NANOPARTICLE DISPERSION". Adv. Mat. 2008, 20, 4163-4166" and "PREPARATION AND OPTICAL PROPERTIES OF COLLOIDAL MONODISPERSE AND HIGHLY CRYSTALLINE ITO NANOPARTICLES". Chem. Mater. 2008, 20, 2609-2611".

The nanocrystalline transparent semiconducting layer (104) may be realized by any of the well-known procedures to convert chemically-tailored colloidal nanoparticles into high quality transparent mesoporous films. It may be for instance realized by screen-printing, ink-jet printing or spray-coating upon the formulation of suitable inks or pastes containing the weakly-doped metal oxide nanoparticles (105). After the deposition, the film may be subjected to a thermal treatment in air to remove organic compounds and form the nanocrystalline transparent semiconducting layer (104).

According to any realization of the first embodiment, the nanocrystalline transparent semiconducting layer (104) exhibits at $V_{OC}$ high optical transmittance (preferably $T_{LUM}$>85% and TNIR>85%) and an electronic conductivity a comprised between $10^{-7}$ S/cm and $10^{-4}$ S/cm.

In a preferred realization of the first embodiment, the electrochromic layer (106) is formed by a redox electrochromic polymer (113), which is deposited on the top of the nanocrystalline transparent semiconducting layer (104). It may be formed of a conjugated polymer that incorporates at least one of the following electro-optically active compounds: quinone, imide, carbazole, viologen, triphenyl amine. In various realizations of the here disclosed invention the conjugated polymer is preferentially a polyaniline, a polythiophene or a polypirrole.

The electrochromic layer (106) remains substantially transparent upon the application of a negative (anodic) potential lower than $V_{NIR-SAT}$, while it gets coloured (either partially or fully) at higher potentials, namely at anodic potentials comprised between $V_{LUM1-ON}$ and $V_{LUM1-SAT}$. A specific condition that enables the dual band selective spectral control of the optical transmittance is the position of the conduction band edge of the weakly-doped metal oxide nanoparticles (105) with respect to the value of lowest onset redox potential of the redox electrochromic polymer (113): the conduction band edge of the weakly-doped metal oxide nanoparticles (105) must be among 10 meV and 500 meV lower than the onset redox potential of the electrochromic layer (106), and preferably between 100 meV and 250 meV.

With reference to the schematic "T vs V" diagram reported in FIG. 1, when a negative (anodic) potential ranging between $V_{NIR-ON}$ and $V_{NIR-SAT}$ is applied to the transparent conductive substrate (100), $T_{NIR}$ is consistently reduced as effect of the increase of the optical density of the nanocrystalline transparent semiconducting layer (104), so making the dual band electrochromic device to switch from a $T_{NIR}$ higher than 75%, and preferably higher than 85%, to $T_{NIR}$ lower than 10%, and preferably lower than 5%, while $T_{LUM}$ remains higher than 75%, and preferably higher than 85%. At higher negative potentials, namely from $V_{LUM1-ON}$ to $V_{LUM1-SAT}$, a dramatic reduction of $T_{LUM}$ comes to be produced too as effect of an electrochemical reduction of the electrochromic polymer layer (106). When a positive potential ranging between $V_{OC}$ and $-V_{LUM2-ON}$ is applied to the transparent conductive substrate (100) the dual band electrochromic device returns to its fully transparent state.

In a second embodiment of the here disclosed thermo-responsive dual band electrochromic device, the first electro-optically active electrode (103) is made of a combination of a plurality of transparent metal oxide nanoparticles (107), which permit regulating the optical transmittance in the VIS range, and at least a electrochromic plasmonic layer (108), which covers each of the plurality of transparent metal oxide nanoparticles (107) and permits regulating the optical transmittance in the NIR range.

Figure 3:
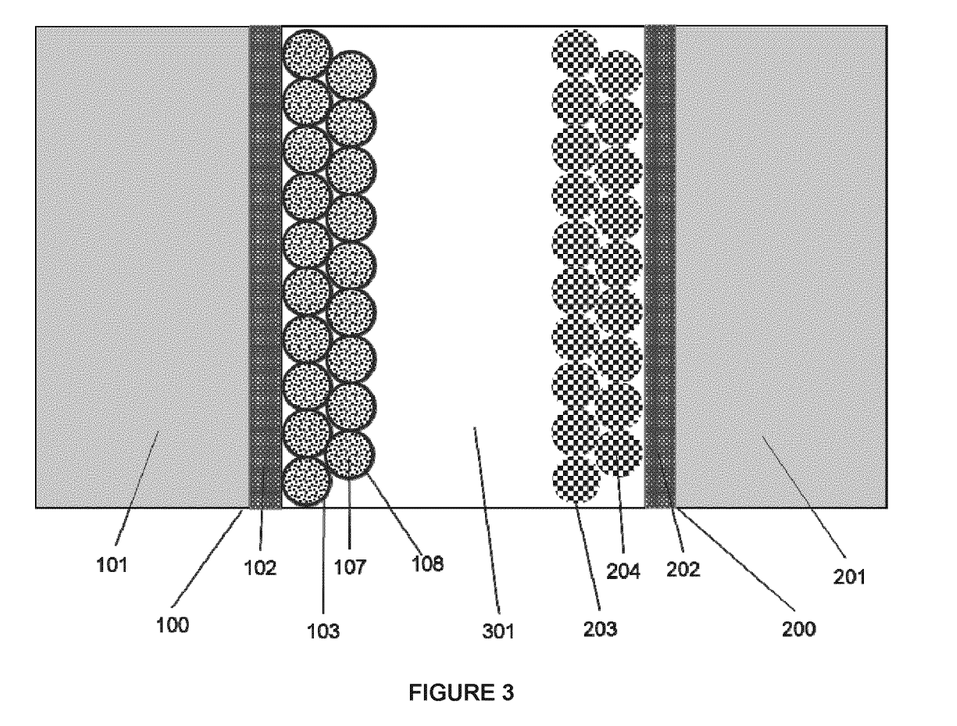

In a preferred realization of the second embodiment, which is schematically depicted in FIG. 3, the first electro-optically active electrode (103) is formed by a plurality of core-shell building blocks wherein the outer electrochromic plasmonic layer (108) is preferably made of a transparent semiconducting material capable of selectively regulating $T_{NIR}$ upon the application of a negative (anodic) potential comprised between $V_{NIR-ON}$ and $V_{NIR-SAT}$, while the inner electrochromic region (107) is made by a metal transition oxide that selectively absorbs the incoming VIS radiation upon the application of a negative (anodic) potential compromised between $V_{LUM1-ON}$ and $V_{LUM1-SAT}$.

The conduction band edge of the electrochromic plasmonic layer (108) is at an electrochemical potential lower than the inner region. The potential gap $\Delta V$ between the conduction band edge of the inner and the outer material is comprised between 10 mV and 900 mV, and preferably between 100 meV and 500 meV.

In a preferred realization of the second embodiment, the outer electrochromic plasmonic layer (108) exhibits, at $V_{OC}$, a LSPR peak in the spectral range comprised between 800 nm and 2500 nm. It may be preferentially formed of one the following materials: Cs-doped tungsten oxide, Nb-doped titanium oxide, Al-doped zinc oxide, Zn-doped tin oxide, and mixtures thereof. The inner region (107) consists of an electrochromic metal oxide that is preferentially chosen among the following: tungsten oxide, molybdenum oxide, niobium oxide, titanium oxide, copper oxide, iridium oxide, chromium oxide, manganese oxide, vanadium oxide, nickel oxide, cobalt oxide and the like.

In any realization of the second embodiment, only the outer electrochromic plasmonic layer (108) is physically in contact with the temperature-dependent ion conducting medium (301).

Upon the application of anodic potentials comprised in the range between $V_{NIR-ON}$ and $V_{NIR-SAT}$, the electrons accumulating on the surface of the electrochromic plasmonic layer (108) give rise to a blue-shift and intensification of the LSPR that is marked, as referred above, by strong optical extinction in the NIR range.

At higher potentials diffusion-driven ion insertion into the inner electrochromic region (107) turns into a remarkable modulation of the VIS absorption too.

To allow ion insertion into the inner region (107), thickness of the outer electrochromic plasmonic layer (108) must be comprised between 0.1 and 10 nm and preferably between 1 nm and 5 nm, while the radius of the inner electrochromic region (107) may be comprised between 1 and 100 nm, and preferably between 5 nm and 25 nm.

Figure 4:
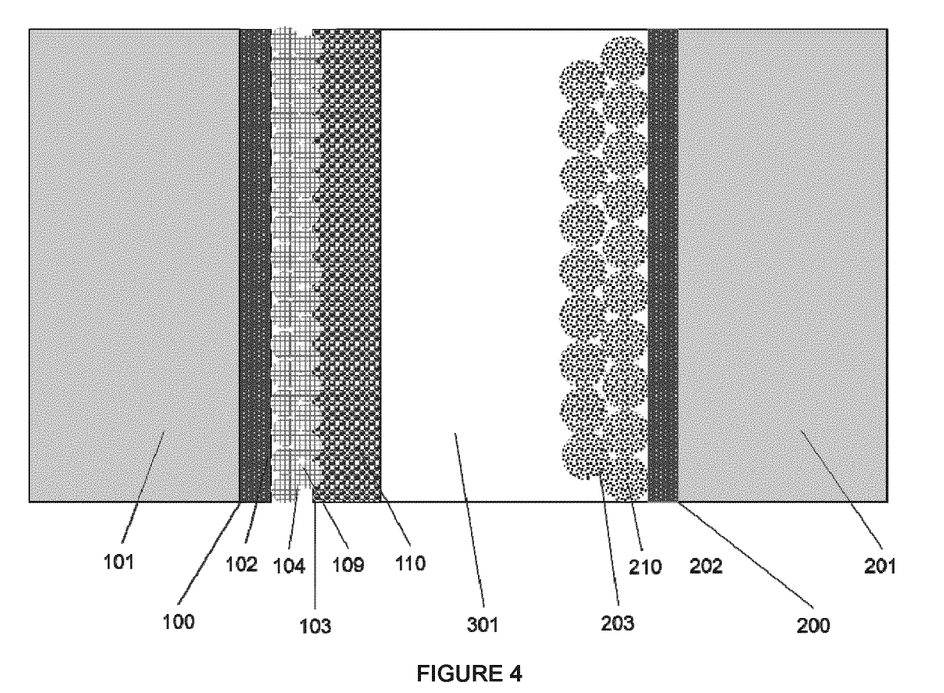

In a third embodiment of the here disclosed thermo-responsive dual band electrochromic device, which is schematically depicted in FIG. 4, the first electro-optically active electrode (103) consists of a first transparent nanocrystalline semiconducting layer (109) that remains substantially transparent both in the VIS and in the NIR range over the whole operative potential range of the thermo-responsive dual band electrochromic device, and of an ambipolar ambipolar electrochromic layer (110), which is capable of reversibly modulating the VIS transmittance in response to both an anodic (negative) and a cathodic (positive) applied potential.

According to a preferred realization of the third embodiment, the first transparent nanocrystalline semiconducting layer (109) doesn't contribute to the modulation of the optical transmittance. It consists of a plurality of transparent metal oxide nanoparticles (109), and preferentially of (un-doped) titanium dioxide nanoparticles or (undoped) zinc oxide nanoparticles, which are deposited on top of the transparent conductive substrate (100) to form a thin mesoporous layer, which is then used as template for the deposition of the electrochromic layer (105).

The transparent metal oxide nanoparticles (109) can be produced by a variety of sol-gel chemistry procedures that are well known to experts of the field (Niederberger, NON-AQUEOUS SOL-GEL ROUTES TO METAL OXIDE NANOPARTICLES. Acc. Chem. Res., 2007 40, 9, 793-

800). The average size of the electro-optically passive transparent semiconducting nanoparticles (109) is comprised in the range between 1 nm and 30 nm and preferentially in the range between 1 nm and 5 nm. They are deposited on the top of the first transparent conductive substrate (100) through one of the well-known film deposition techniques (spin-coating, screen-printing, slot-die etc). A post-deposition thermal treatment may be required depending on the specific synthetic route adopted to prepare the nanoparticles suspension. The thickness of the transparent nanocrystalline semiconducting layer formed by the (electro-optically passive) metal oxide nanoparticles (109) is comprised between 1 nm and 500 nm and preferably between 5 nm and 100 nm.

According the same preferred realization of the third embodiment, the electrochromic layer (104) is formed by an ambipolar redox electrochromic polymer (115), which is capable of undergoing reversible electrochemical processes and strong colour changes upon both electro-oxidation and electro-reduction. It is capable indeed of reversibly modulating the visible transmittance $T_{LUM}$ in response to both an anodic or a cathodic bias voltage. This makes the here disclosed dual band electrochromic device undergoing a selective reversible modulation of $T_{LUM}$ upon the application of a positive (cathodic) voltage bias comprised between $V_{LUM2-ON}$ and $V_{LUM2-SAT}$.

The ambipolar redox polymeric layer (110) preferably consists of an aromatic polyimide or a polyanthraquinone whereon an electroactive terminal triphenylamine or carbazole group is grafted and acts as colour centre. It may be prepared through a two-step polymerisation procedure as that reported by Chang et al. in NOVEL RAPID SWITCHING AND BLEACHING ELECTROCHROMIC POLYIMIDES CONTAINING TRIARYLAMINE WITH 2-PHENYL-2-ISOPROPYL GROUPS (Polymer, 51, 2010, 4493-4502) or by electropolymerization, as reported by Koyuncu et al. in AN AMBIPOLAR ELECTROCHROMIC POLYMER BASED ON CARBAZOLE AND NAPHTHALENE BISIMIDE: SYNTHESIS AND ELECTRO-OPTICAL PROPERTIES (Electrochimica Acta, 68, 2012, 184-191), or by electrochemical polymerization and conventional polycondensation methods as disclosed in Hsiao et al. in A COMPARATIVE STUDY OF REDOX-ACTIVE, AMBIPOLAR ELECTROCHROMIC TRIPHENYLAMINE-BASED POLYIMIDES PREPARED BY ELECTROCHEMICAL POLYMERIZATION AND CONVENTIONAL POLYCONDENSATION METHODS (Pol. Chem., 2018, 9(2), 236-248).

In any embodiment of the here disclosed invention the thickness of the first electro-optically active electrode (103) is comprised between 50 nm and 2000 nm, and preferably between 150 nm and 500 nm.

Second Electro-Optically Electrode

In both a first and a second preferred embodiment of the here disclosed invention, the second electro-optically electrode (203) acts as ion storage layer. It is made of a plurality of transparent semiconducting nanoparticles (204) that result substantially transparent in the spectral range comprised between 380 nm and 2500 nm under the application of any cathodic (positive) potential, substantially transparent in the spectral range comprised between 380 nm and 700 nm under the application of an anodic (negative) potential comprised between $V_{OC}$ and $V_{LUM2-ON}$ and substantially transparent in the spectral range comprised between 700 nm and 2500 nm under the application of an anodic (negative) potential comprised between $V_{OC}$ and $V_{LUM2-SAT}$.

The transparent electro-optically passive semiconducting nanoparticles (204) may be made of transparent metal oxides such as indium oxide, tin oxide, manganese oxide, zinc oxide, gallium oxide, molybdenum oxide, iron oxide, and mixtures thereof, and preferably a mixture of cerium dioxide and titanium oxide.

In a third preferred embodiment of the here disclosed invention, which corresponds to schematic drawing reported in FIG. 4, the second electrode (203) is an electro-optically active electrode as well and consist of a transparent nanocrystalline semiconducting layer (210) that exhibit an electrochemically tuneable localized surface plasmon resonance scattering in a spectral region comprised between 800 nm and 2500 nm while the first electro-optically active electrode (103) is only constituted by the ambipolar electrochromic polymer (110), deposited on the top of the first transparent conductive substrate.

The transparent nanocrystalline semiconducting layer (210) of the second nanostructured electrode (203) is realized as the methodology previously described for the transparent semiconducting layer used as first electro-optically active electrode (103) of a preferred realization of the first embodiment. It is preferably formed by at least one of following materials: sub-stoichiometric tungsten oxide, Sn-doped indium oxide (or indium tin oxide, ITO), Nb-doped titanium oxide, Cs-doped tungsten oxide, Al-doped zinc oxide and may be formed according to the same procedure described afore.

Its spectral response is substantially complementary to that of the ambipolar electrochromic polymer (110) that exclusively responds in the VIS range. Its optical density can be electrochemically tuned to regulate $T_{NIR}$ under the application of a negative (anodic) potential comprised between $V_{NIR-ON}$ and $V_{NIR-SAT}$, while maintaining high values of $T_{LUM}$, preferably higher than 85%.

In any embodiment the thickness of the second electro-optically active electrode (203) is comprised between 100 nm and 4000 nm, and preferably between 200 nm and 1000 nm.

Temperature-Dependent Ion Conductive Layer

In any embodiment of the here disclosed invention, the first electro-optically active electrode (103) and the second electro-optically active electrode (203) are interfaced with a temperature-dependent ion conductive layer (301), which provides both positive and negative ions to guarantee the charge neutrality at any applied bias.

In recent years, increasing attention has been paid to the investigation of temperature-dependent ionic conductivity and assembled structures of several different ionic liquid-based block copolymers having a thermo responsive segment have been proposed. For example, thermo-reversible polymer gels using a poly(ethylene oxide)-based triblock copolymer, which self-assembles into different microcrystalline phases by temperature change, have been developed as novel polymer gel electrolytes exhibiting microphase-dependent ionic conductivity (see for instance "IONIC CONDUCTIVITY THROUGH THERMO-RESPONSIVE POLYMER GEL: ORDERING MATTERS", Langmuir 2012, 28, 751-756).

The temperature-dependent ion conductive layer (301) disclosed in the here referred thermo-responsive dual band electrochromic device comprises at least a thermo-responsive polymer gel, at least one ionic compound and at least one organic plasticizer.

The thermo-responsive polymer gel may be formed by at least two blocks of polymers of which at least one consists of an ionic liquid-based block and another consists of a polar polymer that may be at least partially crystalline at room temperature.

The ionic liquid-based polymer block may be made of several classes of linear quaternised copolymers which are stable over a wide range of temperatures. The ionic liquid-based polymer block may be obtained by polymerizing the electrolyte precursor solution comprising the ionic liquid and at least one species of monomers capable of forming a gel by polymerization. The ionic liquid can contain a positively charged cyclic amine group as pyrazolium, pyrrolidinium, pyrrolium and preferably imidazolium and pyridinium.

The other constitutional element is a polar polymer block which can be synthetized starting from conventional monomer known to one skilled in the art. There is no limitation in the kind of monomer as long as it is capable of forming a gel polymer by polymerization. Examples of copolymerizable monomers are styrene-containing monomers such as styrene itself, divinyl benzene, cyano-group-containing monomers such as methacrylonitrile, unsaturated carboxylic acids such as acrylic acid and their salts such as sodium acrylate, acid anhydrides such as maleic anhydride, esters such as methyl methacrylate, ethyl acrylate, propyl acrylate, tetra(ethylene glycol) diacrylate, hydroxyethyl methacrylate, vinyl halides such as vinyl chloride, vinyl fluoride, and vinyl bromide, vinylidene halide monomers such as vinylidene chloride, vinylidene fluoride, and vinylidene bromide, vinyl esters such as vinyl formate, vinyl acetate, vinyl group-containing acids compounds or their salts, anhydrides or derivatives, such as p-styrenesulfonic acid, methallylsulfonic acid, vinyl ethers such as methyl vinyl ether, dienes such as butadiene, isoprene and chloroprene. Good candidates are for example polymers containing alkyl methacrylate monomer units combined with alkyl pyridine and/or alkyl imidazole monomer units; the said units may be present in appropriate ratios. The electrolyte precursor solution may further comprise a conventional polymerization initiator known to people skilled in the art.

The ionic compound used in the present invention may consist of an organic cation and inorganic anion, compatible with the ionic liquid-based copolymer block. Compatibility mainly depends on the kind of anion and critically affects the transparency of a gel polymer electrolyte using the ionic liquid and vinyl monomer. The kind of anion in an ionic liquid determines whether the ionic liquid is hydrophilic or hydrophobic. Any lithium salts or acids known to one skilled in the art may be used. Suitable ion conductors are the lithium salts $LiClO_4$, $LiCF_3SO_3$, $LiPF_6$, $UN(CF_3SO)_2$, $LiBF_4$, and $LiAsF_6$ as well as other salts, including K-based salts, Na-based salts, Al-based as well as a wide variety of organic salts, and preferentially tetraalkyl ammonium organic sulfonates and perchlorates.

In vary embodiments the temperature dependent ion-conductive layer (301) also includes at least one plasticizer or alternative co-solvent, which is substantially miscible in the polymer framework. Examples of suitable plasticizers or co-solvents are: methyl sulfolane, propylene carbonate, a-butyrolactone, polyethylene glycol, glycerol, sorbitol, diethylene glycol, dipropylene glycol, ethylene glycol, and/or propylene glycol. Their overall concentration is typically lower than 20 wt % and preferably lower than 10 wt %.

The temperature-dependent ion-conductive layer is preferably used under the form of a viscous gel suitable to be cured by thermal treatment or UV radiation exposure after being deposited onto one of the two electro-optically active electrodes (103) or (203). In a preferred preparation method, the ionic compound is dissolved in a suitable solvent and then mixed with the thermo-responsive polymer gel and the plasticizer. A representative but not exhaustive list of suitable solvents is: ethylene carbonate, propylene carbonate, dimethyl carbonate, diethyl carbonate, dimethyl formamide, tetrahydrofuran and mixtures thereof. Then, in order to solidify the electrolyte, solvent is partially removed after preparation. It can be alternatively adopted under the form of a laminated (or extruded) solid-state film (or membrane).

In general terms, the interfacial region between the temperature-dependent ion-conductive layer and the two electro-optically active electrodes typically, though not necessarily, has a heterogeneous structure that includes at least two discrete components represented by different phases and/or compositions, which phases, or compositions vary in concentration over the width of the interfacial region.

In any embodiments the ionic conductivity of the temperature-dependent ion conductive layer (301) varies with temperature. It may oscillate from $10^{-7}$ S/cm to $10^{-4}$ S/cm in a range of temperatures comprised between $-5°$ C. and $+80°$ C.

The entity of NIR optical transmittance variation associated to the temperature changes can be adjusted by finely tailoring the composition of the temperature-dependent ion conductive layer. The manners in which the here disclosed invention can be realized are not limited to some specific relationship between transmittance and temperature nor to any exclusive formulation of the temperature-dependent ion conductive medium. The present disclosure rather contemplates any formulation of the temperature-dependent ion conductive layer (301) complying with the principle of thermally-driven reduction of optical transmittance of an electro-optically active electrode as effect of the increment of the density of available ions from the electrolyte at a given applied voltage.

The thickness of the thermo-responsive ion conductive layer (301) is comprised between 100 nm and 100000 nm and preferably between 500 nm and 5000 nm.

SUMMARY OF THE PREFERRED EMBODIMENTS

Figure 2:
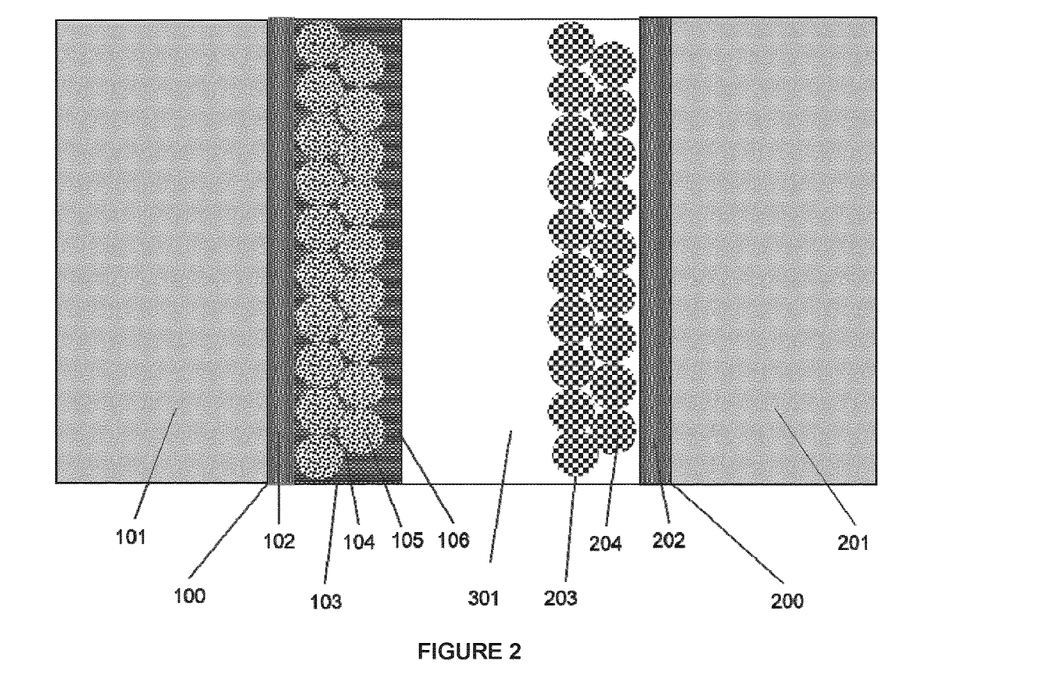
FIG. 2 discloses a schematic cross-sectional view of the thermo-responsive dual-band electrochromic device realized according to the first preferred embodiment FIG. 3 discloses a schematic cross-sectional view of the thermo-responsive dual-band electrochromic device realized according to a second preferred embodiment FIG. 4 discloses a schematic cross-sectional view of the thermo-responsive dual-band electrochromic device realized according to a third preferred embodiment.

In a first preferred embodiment the dual band electrochromic device of the invention comprises:
  a) a transparent conductive substrate (100) where a first electro-optically active electrode (103) is deposited thereon, wherein the first electro-optically active electrode consists of a nanocrystalline transparent semiconducting layer (104) and at least an electrochromic layer (106), wherein the nanocrystalline transparent semiconducting layer (104) consists of a plurality of transparent conductive oxide nanocrystals (105), which permit regulating the optical transmittance in the NIR range, and at least an electrochromic layer (106) is formed by a redox electrochromic polymer (113), which permits regulating the optical transmittance in the VIS range
  b) a second transparent conductive substrate (200) where a second electro-optically active electrode (203) is deposited thereon, wherein the second electro-optically active electrode comprises a plurality of transparent semiconducting nanoparticles (204) that remain substantially transparent over the potential range wherein first nanocrystalline transparent conductive layer (104) can be switched to a low transmittance state.

c) a thermo-responsive ion conductive layer (301) embedded between the first electro-optically active electrode (103) and second electro-optically active electrode (203), which comprises a thermo-responsive polymer gel, an ion conductor and an organic plasticizer In a second preferred embodiment the dual band electrochromic device of the invention comprises:

a) a transparent conductive substrate (100) where a first electro-optically active electrode (103) is deposited thereon, wherein the first electro-optically active electrode consists of a plurality of transparent semiconducting nanoparticles (107) which permit regulating the optical transmittance in the VIS range, and at least an electrochromic plasmonic layer (108) that permits regulating the optical transmittance in the NIR range.

b) a second transparent conductive substrate (200) where a second electro-optically active electrode (203) is deposited thereon, wherein the second electro-optically active electrode comprises a plurality of transparent semiconducting nanoparticles (204) that remain substantially transparent over the potential range wherein first nanocrystalline transparent conductive layer (104) can be switched to a low transmittance state.

c) a temperature-dependent ion conductive layer (301) embedded between the first electro-optically active electrode (103) and second electro-optically electrode (203), which comprise a thermo-responsive polymer gel, a ion conductor and an organic plasticizer In a third preferred embodiment the thermo-responsive dual band electrochromic device of the invention comprises:

a) a first transparent conductive substrate (100) where a first electro-optically active electrode (103) is deposited thereon, wherein the first electro-optically active electrode consists of nanocrystalline transparent semiconducting layer (104), which keeps substantially transparent over the over the whole potential range covered by the operation of the thermo-responsive dual band electrochromic device, and of an formed by an ambipolar electrochromic polymer (115), which is capable of reversibly modulating the VIS transmittance in response to both a negative (anodic) and a positive (cathodic) applied potential, b) a second transparent conductive substrate (200) where a second electro-optically active electrode (203) is deposited thereon, wherein the second electro-optically active electrode consists of a plurality of weakly-doped metal oxide nanoparticles (210), which regulate the optical transmittance in the NIR range in response to a negative potential within a range of potentials, wherein the ambipolar electrochromic polymer results substantially transparent, c) a thermo-responsive ion conductive layer (301) embedded between the first electro-optically active electrode (103) and the second electro-optically active electrode (203), which comprises a thermo-responsive polymer gel, an ion conductor and an organic plasticizer In the following examples, three specific thermo-responsive dual band electrochromic devices are described according with the three above referred preferred embodiments of the here disclosed invention.

EXAMPLES

Figure 5:
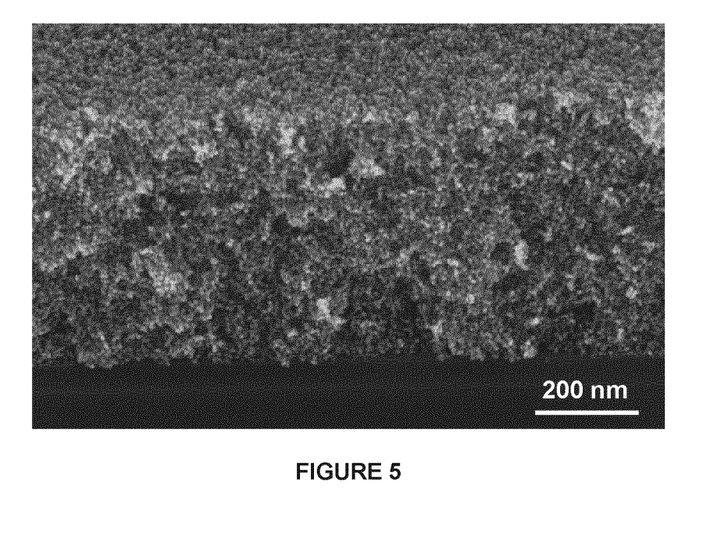
FIG. 5 discloses a cross-section view of a nanocrystalline transparent conductive layer made by ITO nanoparticles realized according to the preparation procedure described in the example 1.

Example 1: A Thermo-Responsive Dual Band Electrochromic Device Realized According to a First Preferred Embodiment According to a first preferred embodiment, the dual band electrochromic device is formed by:

1) a first electro-optically active electrode (103) consisting of a 1100 nm-thick mesoporous indium tin oxide (ITO) film, acting as a nanocrystalline transparent conductive layer (104), topped by a 150 nm-thick polyaniline layer, acting as redox electrochromic polymeric layer (113). To prepare the optically active electrode (103) a 3 ml suspension of 20 nm-sized ITO nanocrystals ($In_2O_3$:$SnO_2$ 90:10, 10 wt % in ethanol, purchased from Avantama™) was mixed with 5 ml of α-terpineol and 0.65 g of ethyl cellulose to prepare a suitably viscous slurry, which was subsequently deposited by screen-printing on an 1.1 mm thick ITO-coated glass substrate (100) (40 Ω/sq, purchased from Xinyan Technology Ltd). The films are subjected to a thermal treatment in air at 390° C. for 30 min (after two intermediate 30 min heating steps at 130° C. and 250° C.). The polyaniline layer was deposited over the mesoporous ITO electrode by potentiodynamic electro-oxidation of aniline purchased from Sigma Aldrich) in 0.5 M $H_2SO_4$, over a potential range comprised between −0.2 V and +1.3 V (vs AgCl/Ag), following a process such as that disclosed in Dalmolin et al. ELECTROPOLYMERIZATION OF POLYANILINE ON HIGH SURFACE AREA CARBON SUBSTRATES, Journal of Electroanalytical Chemistry, 2005 578, 1, 9-15.

2) a second electro-optically electrode (203), made of a 600 nm-thick mesoporous layer comprising an 80% of cerium oxide nanoparticles and a 20% of titanium dioxide nanoparticles. It is obtained by mixing a CeOx-based sol-gel paste with a TiOx-based sol-gel, both prepared through the procedure reported by Munro et al. in ALL SOL-GEL ELECTROCHROMIC SYSTEM FOR PLATE GLASS Journal of Non-Crystalline Solids, 1997, 218, 185-188. The sol gel paste was deposited onto a 2 mm-thick ITO-coated glass substrate (200) (40 Ω/sq, purchased from Xinyan Technology Ltd) and then subjected to a thermal treatment in air at 450° C. for 30 min (after two intermediate 30 min heating steps at 130° C. and 250° C.).

3) a temperature-dependent ion conductive layer (301) laminated between the first and the second electro-optically active electrode. It is composed of a 39% wt of polymethylmethacrylate (MW 120 kDa), a 45% wt of vinylimidazolium-grafted polymethylmethacrylate (prepared according to the method described in EP2571904), a 10% wt of $LiClO_4$, a 5% wt of diethylene glycol and 1% wt of propylene carbonate. It is prepared by dissolving a measured volume of dry $LiClO_4$ in in a dry sealed vessel filled with propylene carbonate. Then a measured weight of polymethylmethacrylate (MW 120 k Da) is added and the vessel is heated to 85° C. under mechanical stirring until the polymer is completely dissolved. A measured weight of vinyl-imidazolium-grafted polymethylmethacrylate (MW 11 k Da) is finally added to the solution and dissolved under continuous stirring at the same temperature.

The device was assembled in to form the sandwich architecture depicted in FIG. 2 upon depositing the temperature-dependent ion conductive layer (301) onto the second electro-optically active electrode (203). The first electro-optically active layer (103) was then pushed on top of the gel and the two glasses subjected to a lamination process in autoclave at 130 C and 0.2 bar, according to the fabrication method described in EP1227362.

Example 2: A Thermo-Responsive Dual Band Electrochromic Device Realized According to a Second Preferred Embodiment According to a second preferred embodiment, the dual band electrochromic device is formed by:
1) a first electro-optically active layer (103) consisting of a 600 nm-thick mesoporous (undoped) $TiO_2$ (anatase) layer, acting as inner electrochromic region (107), topped by a 5 nm of Nb-doped titanium oxide acting as electrochromic plasmonic layer (108). It was realized by using a commercial viscous paste containing 18 nm-sized $TiO_2$ anatase nanoparticles (Dyesol™ 18NRT), which is deposited by screen-printing onto a 2 mm-thick ITO-coated glass substrate (100) (40 Ω/sq, purchased from Xinyan Technology Ltd). The film was then subjected to a thermal treatment in air at 450° C. for 30 min (after two intermediate 30 min heating steps at 130° C. and 250° C.). The Nb-doped $TiO_2$ outer electrochromic plasmonic layer was realized by dipping the mesoporous $TiO_2$ film in a sol-gel solution composed of tetraethylorthotitanate [$Ti(OCH_2CH_3)_4$], niobium ethoxide [$Nb(OCH_2CH_3)_5$] and ethanol as solvent, with 2,4-pentanedione acting as chelating agent. The molar ratio between $TiO_2$ and $Nb_2O_5$ was set at 90:10, which corresponds to a Nb concentration of about 7 wt %. The film was thermally treated again at 450° C. (in air). The procedure was repeated several times till the desired thickness (5 nm) was obtained.
2) a second electro-optically active electrode (203), made of an 800 nm-thick mesoporous layer containing an 80% of cerium oxide and 20% of titanium dioxide deposited onto a 2 mm-thick ITO-coated glass (200) (40 Ω/sq, purchased from Xinyan Technology Ltd) according to the procedure described in the Example 1.
3) a temperature-dependent ion conductive layer (301) laminated between the first electro-optically active electrode (103) and the second electro-optically active electrode (203). It is composed by a 75% wt of thermo-responsive ion conductive polymer, 24% wt of polymethylmethacrylate (MW 20 k Da, purchased from Sigma Aldrich) and 1% of propylene carbonate (purchased from Sigma Aldrich). The thermo-responsive ion conductive polymer was prepared by radical copolymerization of lithium N-methane-sulfonyl-vinyl-sulfonimide with poly(ethylene glycol) methyl ether acrylate according to the procedure reported by Matsumura et al. in COMMUNICATION—SYNTHESIS OF FLUORINE-FREE HIGHLY ION CONDUCTIVE POLYMER ELECTROLYTE HAVING LITHIUM BISSULFONIMIDE UNIT, J. Electrochem. Soc. 2018, 165, 8, B3119-B3121.

The device was assembled in to form the sandwich architecture depicted in FIG. 3 upon depositing the temperature-dependent ion conductive layer (301) onto the second electro-optically active electrode (203). The first electro-optically active layer (103) was then pushed on top of the gel and the two glasses subjected to a lamination process in autoclave at 130 C and 0.2 bar, according to the fabrication method described in EP1227362.

Example 3: A Thermo-Responsive Dual Band Electrochromic Device Realized According to a Third Preferred Embodiment According to a third preferred embodiment, the dual band electrochromic device is formed by:
1) a first electro-optically active electrode (103), which consists of a first plurality of ZnO nanoparticles having an average size of 3 nm deposited onto a 1.1 mm-thick ITO-coated glass substrate (100) (20 Ω/sq, purchased from Xinyan Technology Ltd) to form a 50 nm-thick nanocrystalline transparent semiconducting layer (104), topped by a 300 nm-thick ambipolar electrochromic layer (110) formed by an electro-generated aromatic polyimide as ambipolar electrochromic polymer (115).
2) a second electro-optically active electrode (203), which consists of a 1100 nm-thick nanocrystalline film made of 20 nm-sized ITO nanocrystals that is deposited onto a 1.1 mm-thick ITO-coated glass substrate (200) (20 Ω/sq, purchased from Xinyan Technology Ltd,
3) a temperature-dependent ion conductive layer (301) laminated between the first electro-optically active electrode (103) and the second electro-optically active electrode (203). It is composed of a 39% wt of polymethylmethacrylate, 49% wt poly(1-vinylimidazole-co-methylmethacrylate, 18 kDa purchased from lolitek), 8% wt of tetrabutylammonium perchlorate ($TBAClO_4$, purchased Sigma Aldrich), 3% wt of diethylene glycol (purchased from Sigma Aldrich), 1% wt of propylene carbonate (purchased from Sigma Aldrich).

The AZO nanoparticles used to prepare the nanocrystalline transparent semiconducting layer (104) were synthesized according to the following procedure: 0.225 g of aluminium isopropylate $Al[(CH_3)_2CHO]_3$ and 10.98 g of zinc acetate dihydrate $Zn(CH_3COO)_{22}H_2O$ were dissolved in 500 mL of ethanol. The resulted solution was refluxed at 85 C until 200 mL of ethanol was evaporated. KOH was taken instead of LiOH to avoid a possible co-doping with $Li^+$. 4.21 g of KOH was added to the solution and dissolved using an ultrasonic bath to obtain a transparent solution. 3 mL of water were added drop-wise in the boiling solution under constant agitation using a magnetic stirrer. After adding water, the solution was tightly closed and agitated during 16 h at room temperature. The resulted AZO nanoparticles were separated from the supernatant solution by centrifugation, washed with ethanol thrice and redispased in ethanol. To stabilize the obtained AZO colloid, diethanolamine (DEA) was added to ensure the molar ratio of Zn/DEA equal to 1.0. The obtained colloid solution with the AZO nanoparticles was deposited by spin-coating onto a 1.1 mm-thick ITO-coated glass substrate (100). The film demonstrated excellent homogeneity and transparency (T>90%) in the visible spectrum after heating at 400° C.

Figure 6:
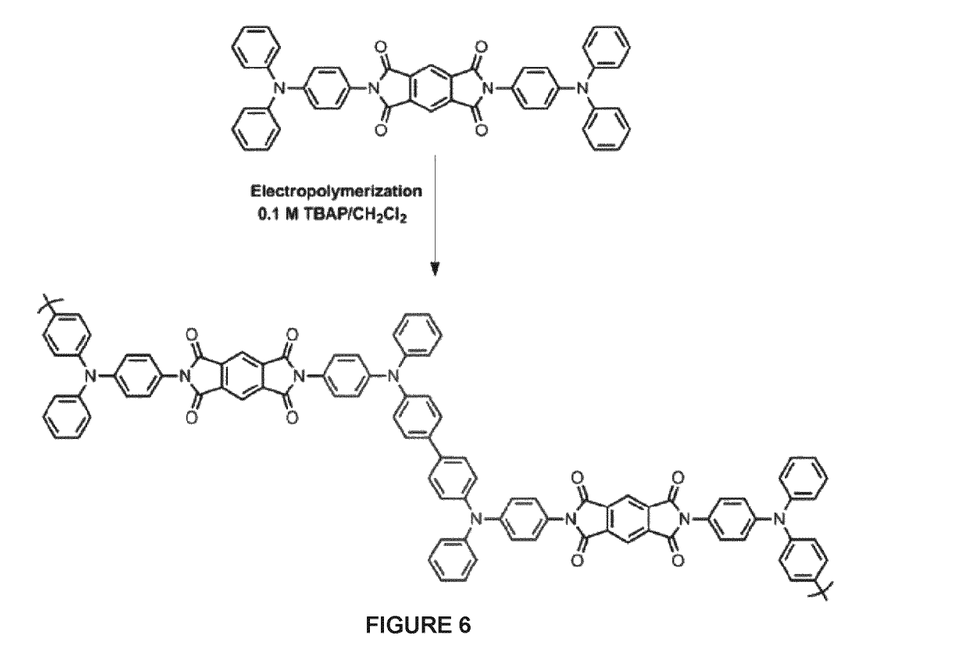
FIG. 6 discloses the scheme for the electro-generation of the aromatic polyimide adopted as ambipolar electrochromic polymer in the example 3.

The electrogenerated aromatic polyimide (115) was obtained by electropolymerization of the N,N'-Bis(4-diphenylaminophenyl) pyromellitimide in $1 \times 10^{-3}$ M solution in 0.1 M $Bu_4NClO_4$ (TBAP from Sigma Aldrich) in dichloromethane via cyclic voltammetry repetitive cycling (between 0 and 1.4 V) at a scan rate of 20 mV $s^{-1}$ for 10 cycles, according to the schematic reaction reported in FIG. 6. The N,N'-bis(4-diphenylaminophenyl) pyromellitimide was obtained from the condensation of pyromellitic dianhydride (purchased from Sigma Aldrich) with two equivalent amounts of 4-aminotriphenylamine (purchased from Sigma Aldrich) according to the synthetic procedure described by Jeon et al. in SYNTHESIS AND CHARACTERIZATION OF STAR-SHAPED IMIDE COMPOUNDS, Rapid Communication in Photoscience, 2012, 1, 19-20.

The ITO nanocrystalline film employed as second electro-optically active electrode was prepared through the same procedure used in the fabrication of the first nanocrystalline transparent conductive layer (104), which is described in the example 1.

The temperature-dependent ion conductive layer was prepared by dissolving 1.5 g of $TBAClO_4$ and 0.75 g of ethylene glycol in in a vessel with 20 ml of propylene carbonate. Then an amount of 7.5 g of polymethylmethacrylate (20 kDa purchased from Sigma Aldrich) is added and the vessel is heated to 75° C. under mechanical stirring until the polymer is completely dissolved; an amount of 9.0 g of poly(1-vinylimidazole-co-methylmethacrylate) (18 kDa from Iolitek) is finally added to the solution and dissolved under continuous stirring at the same temperature. The vessel is then cooled to room temperature and laminated between the first electro-optically active electrode and the second electro-optically active electrode. The thickness of the temperature-dependent ion conductive layer upon the lamination process is of about 1800 nm.

The invention claimed is:

1. A dual band electrochromic device comprising:
a first transparent conductive substrate where a first electro-optically active electrode is deposited thereon, wherein the first electro-optically active electrode consists of a first nanocrystalline transparent semiconducting layer and at least an electrochromic layer,
a second transparent conductive substrate where a second electro-optically active electrode is deposited thereon, wherein the second electro-optically active electrode consists of a second nanocrystalline transparent semiconducting layer,
a temperature-dependent ion conductive layer embedded between the first electro-optically active electrode and the second electro-optically active electrode, which comprises a thermo-responsive polymer gel, an ion conductor and an organic plasticizer, wherein
the first electro-optically active electrode is capable of selectively regulating the optical transmittance in the near-infrared spectral range upon the application of an electric bias comprised in a first range of potentials and the optical transmittance in the visible range upon the application of an electric bias comprised in a second range of potentials,
the second electro-optically active electrode can regulate the optical transmittance in the near-infrared range upon the application of an electric bias comprised in a third range of potentials not overlapped neither to the first nor to the second range of potentials of the first electro-optically active electrode, and
the temperature-dependent ion conductive layer can regulate the density of the electric charges flowing between the first and the second electro-optically active electrode according to the temperature variation.

2. The device according to claim 1, wherein the first nanocrystalline transparent semiconducting layer comprises a plurality of weakly doped metal oxides nanoparticles as well as Sn-doped indium oxide, Nb-doped titanium oxide, Al-doped zinc oxide nanoparticles and preferably Cs-doped tungsten oxide and sub-stoichiometric tungsten oxide nanoparticles.

3. The device according to the claims 2, wherein the first nanocrystalline transparent semiconducting layer exhibits a reversibly tuneable localized surface plasmon resonance in a spectral region comprised between 800 nm and 2500 nm.

4. The device according to claim 1, wherein the at least an electrochromic layer of the first electro-optically active electrode consists of an electrochromic redox polymer.

5. The device according to claim 4, wherein the electrochromic redox polymer is constituted of a conjugated polymer selected from a polyaniline, a polythiophene or a polypirrole and incorporates at least one of the following electro-optically active compounds: quinone, imide, carbazole, viologen, triphenyl amine.

6. The device according to claim 4, wherein a conduction band edge of the first nanocrystalline transparent semiconducting layer results among 10 meV and 500 meV lower than the onset redox potential of the electrochromic redox polymer.

7. The device according to claim 1, wherein the first electro-optically active electrode consists of a plurality of transparent semiconducting nanoparticles formed by at least two distinct electro-optically active materials.

8. The device according to claim 7, wherein at least one of the two distinct electro-optically active materials permits regulating the optical transmittance in the near-infrared range and other permits regulating the optical transmittance in the visible range.

9. The device according to claim 7, wherein the first electro-optically active electrode consists of a plurality of core-shell nanoparticles.

10. The device according to claim 9, wherein a shell of the core-shell nanoparticles permits regulating the optical transmittance in the near-infrared range and a core of the core-shell nanoparticles permits regulating the optical transmittance in the visible range.

11. The device according to any one of claim 1, wherein the second electro-optically active electrode remains substantially transparent over the potential range wherein first nanocrystalline transparent semiconducting layer can be switched to a low transmittance state.

12. The device according to claim 11, wherein the second electro-optically active electrode comprises a plurality of transparent semiconducting nanoparticles, which are made of indium oxide, tin oxide, manganese oxide, zinc oxide, gallium oxide, molybdenum oxide, iron oxide, and mixtures thereof, and preferably by cerium dioxide and titanium oxide.

13. The device according to claim 1, wherein the first electro-optically active electrode comprises a first transparent nanocrystalline semiconducting layer, which remains substantially transparent both in the visible and in the near infrared range over the whole operative potential range, and at least one ambipolar electrochromic polymer, which can reversibly modulate the visible transmittance in response to both an anodic (negative) and a cathodic (positive) applied potential.

14. The device according to claim 13, wherein the at least one ambipolar electrochromic polymer consists of an aromatic polyimide or a polyanthraquinone as main polymeric chain whereon an electroactive terminal triphenylamine or carbazole group is grafted.

15. The device according to the claim 1, wherein the second nanocrystalline transparent semiconducting layer of the second electro-optically active electrode comprises a plurality of transparent semiconducting nanoparticles that exhibit an electrochemically tuneable localized surface plasmon resonance scattering in a spectral region comprised between 800 nm and 2500 nm.

16. The device according to claim 1, wherein the thermo-responsive polymer gel of the temperature-dependent ion conductive layer is formed by at least two blocks of polymers of which at least one consists of an ionic liquid-based polymer block and another consists of a polar polymer block that results at least partially crystalline at room temperature.

17. The device according to claim 16, wherein the ionic liquid-based polymer block is made of a linear quaternised copolymer and the polar polymer block consists of poly (methyl methacrylate), poly(ethyl acrylate) or poly(ethylene oxide).

18. The device according to claim 1, wherein the temperature-dependent ion conductive layer is used under the form of a viscous gel suitable to be cured by thermal treatment or UV radiation after being laminated in between the first electro-optically-active electrode and the second electro-optically active electrode.

19. The device according to claim 6, wherein the conduction band edge of the first nanocrystalline transparent semiconducting layer results among 100 meV and 250 meV lower than the onset redox potential of the electrochromic redox polymer.

20. The device according to claim 17, wherein the linear quaternised copolymer is a copolymer containing at least one alkyl pyridine or at least one alkyl imidazole monomer.

\* \* \* \* \*